United States Patent Office 2,908,112
Patented Oct. 13, 1959

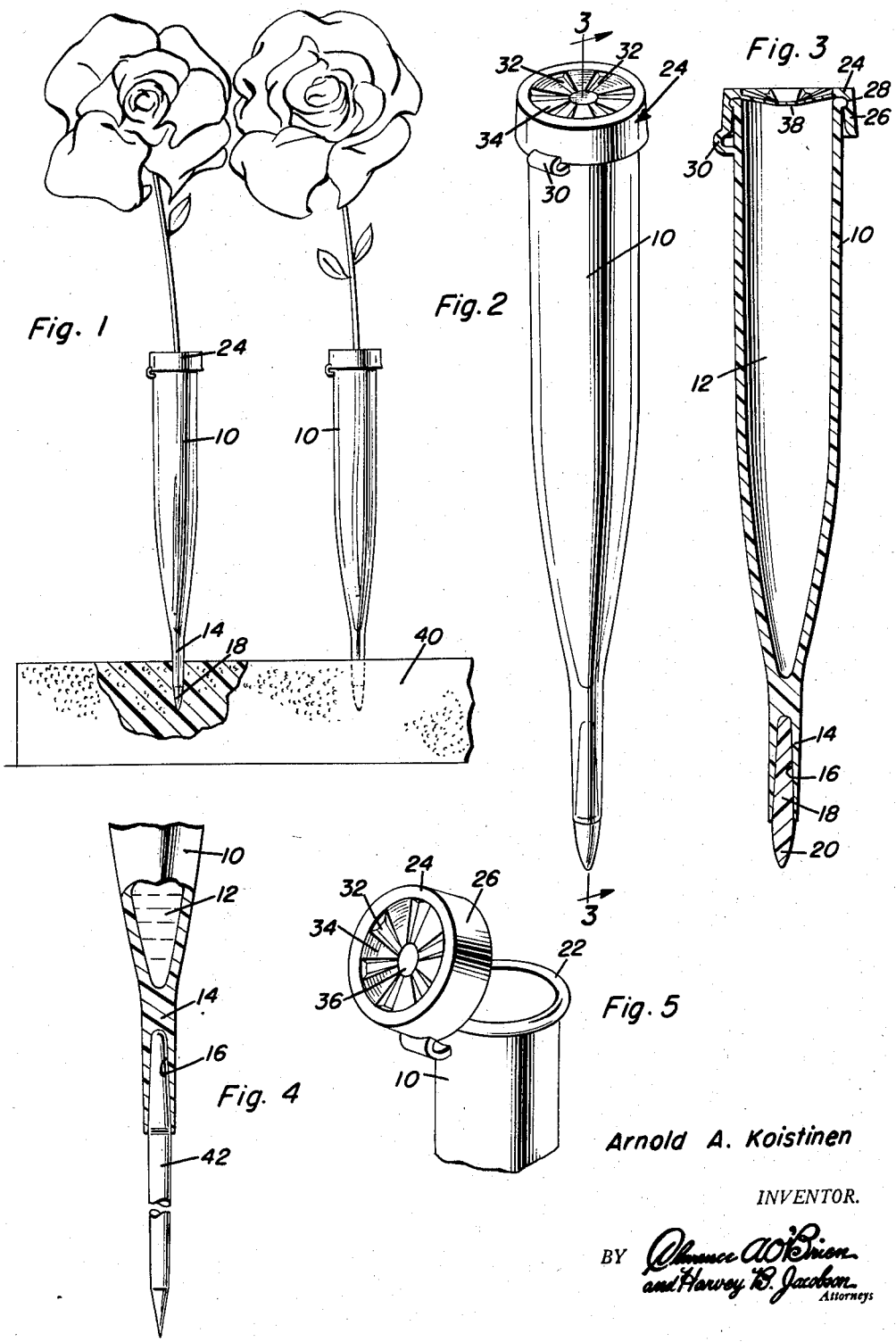

2,908,112

FLORAL DISPLAY CONTAINER

Arnold A. Koistinen, Madison, S. Dak.

Application August 19, 1957, Serial No. 678,967

3 Claims. (Cl. 47—41)

This invention comprises a novel and useful floral display container and more particularly relates to a holder for the stems of flowers or plants for supporting and retaining the same in an improved manner.

The primary purpose of this invention is to provide a holder for the stem of flowers and plants and which although not limited thereto is especially designed for use by florists and others for more effectively supporting the stems of plants in various desired arrangements as for window displays, casket sprays, bouquets, wreaths, center pieces and the like.

An important object of the invention is to provide a flower holder of compact, lightweight and economical construction and which will resiliently support and retain the stems of flowers in a greatly improved manner and with great certainty.

A further important object of the invention is to provide a flower holder in accordance with the foregoing objects which will not only securely grip and hold the stem of plants therein but will also provide a substantially watertight container for receiving therein said stems and thereby increasing the life of the plants.

A still further object of the invention is to provide a holder in accordance with the foregoing objects whereby there is provided a sealed liquid container or reservoir in the holder and a frangible cover which may be ruptured by forcibly inserting the stem of a plant therethrough.

A still further object of the invention is to provide a floral holder in accordance with the above mentioned objects wherein the holder and its cover may be integrally molded from a suitable plastic such as polyethylene and may be integrally connected at one point to permit pivotal movement of the cover.

And a final important object of the invention to be specifically enumerated herein resides in the provision of a flower holder in accordance with the above set forth objects wherein the lower end of the holder is provided with a tubular extension constituting a socket for receiving a fastening spike therein whereby the holder may be accurately positioned as desired, and which will permit the use of different lengths of spikes as desired.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is an elevational view, parts being shown in vertical section, showing the manner in which the improved floral holder of this invention may be utilized to support any desired arrangement the stems of plants;

Figure 2 is a perspective view of one preferred form of the floral holder in accordance with this invention;

Figure 3 is a vertical central sectional view of Figure 2, being taken substantially upon the plane indicated by the section line 3—3 thereof;

Figure 4 is a fragmentary view partly in elevation, partly in vertical section and with parts broken away showing a modified supporting spike inserted into the holder; and Figure 5 is a fragmentary perspective view of the upper portion of Figure 2 but showing the cover of the holder in its open position.

Referring first primarily to Figures 2 and 3 it will be seen that the floral holder of this invention consists of a generally cylindrical vertically elongated tubular body 10 having a chamber 12 therein open at the upper end of the body. Both the chamber and the body at their lower ends are downwardly progressively narrowed or tapered as shown in Figures 2 and 3 having its bottom wall adjacent but spaced above the lower end of the body. The lowermost portion of the body comprises a tubular generally cylindrical depending extension 14 which has therein an axially disposed passage 16 opening at the lower end thereof, this passage preferably being progressively upwardly narrowed and tapered from the lower open end thereof. Received and secured in the socket provided by the passage 16 of the extension 14 is a spike 18 having a pointed lower end 20 depending beneath the body whereby the body may be anchored in any suitable supporting means by inserting the spike therein. The spike may be frictionally encased in the socket or may be secured therein in any suitable manner.

At its upper end, the body 10 is provided with a laterally projected annular ridge or rib 22 for a purpose to be subsequently set forth.

At this point it should be observed that the body may be formed in any desired manner and of any suitable material. It has been found extremely satisfactory for the purpose of the invention to employ a liquid impervious material of a flexible nature such as polyethylene, and especially a material which is durable, resilient and attractive for the purposes intended.

A closure is provided for the open upper end of the chamber of the body this closure consisting of a cover 24 which is V-shaped in configuration, having a substantially flat top wall together with a depending skirt 26 adapted to embrace the upper end of the body 10. Within the skirt 26 there is provided an annular groove 28 so that the skirt below the groove constitutes an annular ridge or rib. The ridge and groove 26 and 28 constitute a locking means providing a snap engagement for releasably securing the cover upon the open top of the body.

The cover is pivotally connected to the body in any suitable manner. Preferably, however, as shown in Figures 2, 3 and 5, the cover is integrally hinged to the body as by a flap 30, the body and the cover being preferably molded together. Thus the cover may be pivoted to an open or closed position as will be apparent from a comparison of Figures 2 and 3 with Figure 5.

The cover is preferably provided with a plurality of radially extending slots 32 extending from the center of the cover in the top wall 24 thereof, these slots providing a plurality of resilient fingers 34 therebetween. The central portion of the cover is preferably provided with a circular aperture as at 36 into which the fingers and slots extend. A sheet of frangible material as at 38 is secured to the underside of the cover, overlying the slots and fingers and thus provide a seal for the chamber 12.

As so far described it will now be understood that the reservoir or chamber 12 within the body may be provided with a suitable liquid and with the seal and cover in place this liquid will be sealed from the atmosphere without danger of leakage. When it is desired to use the holder it is merely necessary to forcibly insert the stem of a plant or flower through the aperture 36 and thereby puncture the seal of the frangible sheet 38, thereby forcing the stem into the interior of the chamber 12. When this is done, the resilient fingers 34 will resiliently embrace and engage the stem, thereby tightly securing the same and establishing an effective leakproof seal between the cover and the stem. Thereafter, the anchoring spike 18 may be inserted into a styroform plank such as that indicated at 40 in Figure 1, or in suitable mats or other suitable supporting means in order to position the plants carried by the supports in various selected arrangements.

It should be noted that the invention particularly lends itself to the use of a spike of any desired length, such as that indicated at 42 in Figure 4. It should be particularly noted that the upwardly converging walls of the socket 16 in the extensions 14 of either of the illustrated arrangements of Figures 3 and 4 will permit the use of different sizes of spikes 18 or 42 by virtue of the tapered frictional engagement of the walls of the socket with the upper tapered ends of the spikes. Thus, the body of the plant holder may be disposed relatively close to the supporting surface such as the surface 40 of Figure 1; or may be positioned at a relatively great distance above the surface by the use of the longer spikes such as that at 42 in Figure 4.

The frangible sheet of sealing material enables liquid to be retained within the reservoir of the floral holder for relatively long periods of time, and the retension of the liquid in the holder when the stem of a plant is inserted therein will keep the plant fresh for very considerable periods of time. It is obvious that the holders could be made of various sizes and materials depending upon the particular use for which they are intended.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A flower holder comprising an elongated liquid impervious tubular body having a cylindrical upper portion with a cylindrical chamber therein of uniform internal diameter and opening at the upper end thereof for receiving the stem of a flower or plant and a downwardly convergent conical lower portion, a removable cover for said upper end, said cover having a plurality of radially extending slots defining resilient fingers therebetween whereby to resiliently grip a stem inserted through said cover into said chamber, said lower portion of said body comprising a tubular extension having a bore therein open at its bottom end, a spike having a shank seated in said extension through said open bottom of said bore and whereby to anchor and support said body, said body having an integral partition separating said bore and chamber, a frangible sheet secured to said cover and overlying said slots and fingers whereby to seal said chamber and retain liquid therein.

2. A flower holder comprising an elongated liquid impervious tubular body having a cylindrical upper portion with a cylindrical chamber therein of uniform internal diameter and opening at the upper end thereof for receiving the stem of a flower or plant and a downwardly convergent conical lower portion, a removable cover for said upper end, said cover having a plurality of radially extending slots defining resilient fingers therebetween whereby to resiliently grip a stem inserted through said cover into said chamber, said lower portion of said body comprising a tubular extension having a bore therein open at its bottom end, a spike having a shank seated in said extension through said open bottom of said bore and whereby to anchor and support said body, said body having an integral partition separating said bore and chamber, said body and cover being of a polyethylene material and are integrally united, said cover being united to said body at one side thereof whereby to provide pivotal movement of said cover.

3. A flower holder comprising an elongated liquid impervious tubular body having a cylindrical upper portion with a cylindrical chamber therein of uniform internal diameter and opening at the upper end thereof for receiving the stem of a flower or plant and a downwardly convergent conical lower portion, a removable cover for said upper end, said cover having a plurality of radially extending slots defining resilient fingers therebetween whereby to resiliently grip a stem inserted through said cover into said chamber, said lower portion of said body comprising a tubular extension having a bore therein open at its bottom end, a spike having a shank seated in said extension through said open bottom of said bore and whereby to anchor and support said body, said body having an integral partition separating said bore and chamber, said body and cover being of a polyethylene material and are integrally united, said cover being united to said body at one side thereof whereby to provide pivotal movement of said cover, said body and cover having cooperating annular ridges for releasable locking engagement.

References Cited in the file of this patent

UNITED STATES PATENTS

| 466,074 | Hunt | Dec. 29, 1891 |
| 1,402,904 | Skidmore | Jan. 10, 1922 |
| 2,733,549 | Moore | Feb. 7, 1956 |
| 2,756,542 | Mossman | July 31, 1956 |

FOREIGN PATENTS

| 22,557 | Great Britain | 1909 |

OTHER REFERENCES

Publication: Florist's Telegraph Delivery Association, vol. 36, No. 6, July, 1938, pages 8 and 9.